United States Patent [19]

Marks et al.

[11] Patent Number: 5,330,948
[45] Date of Patent: Jul. 19, 1994

[54] HOMOGENEOUS CATALYSTS FOR STEREOREGULAR OLEFIN POLYMERIZATION

[75] Inventors: Tobin J. Marks; Moris S. Eisen, both of Evanston; Michael A. Giardello, Skokie, all of Ill.

[73] Assignee: Northwestern University, Evanston, Ill.

[21] Appl. No.: 860,784

[22] Filed: Mar. 31, 1992

[51] Int. Cl.$^5$ .................. C08F 4/64; C08F 4/642; C08F 4/68; C08F 4/62; C08F 4/622

[52] U.S. Cl. .................. 502/104; 502/102; 502/103; 502/117; 502/152; 502/155; 556/11; 556/20; 556/27; 556/43; 556/53; 556/160; 556/351; 556/348.6; 585/275; 585/511

[58] Field of Search ............. 502/102, 103, 104, 117, 502/152, 155; 556/11, 20, 27, 43, 53

[56] References Cited

U.S. PATENT DOCUMENTS

| | | | |
|---|---|---|---|
| 4,794,096 | 12/1988 | Ewen | 502/117 |
| 4,841,004 | 1/1989 | Kaminsky et al. | 502/117 X |
| 4,892,851 | 1/1990 | Ewen et al. | 502/104 |
| 4,931,417 | 6/1990 | Miya et al. | 502/117 |
| 4,975,403 | 12/1990 | Ewen | 502/117 X |
| 5,017,714 | 5/1991 | Welborn, Jr. | 502/117 X |
| 5,066,738 | 11/1991 | Ewen | 502/127 X |
| 5,120,867 | 6/1992 | Welborn | 502/117 X |
| 5,126,303 | 6/1992 | Resconi et al. | 502/117 |
| 5,155,080 | 10/1992 | Elder et al. | 502/117 X |

FOREIGN PATENT DOCUMENTS 0277003 8/1988 European Pat. Off. .
0427697A2 5/1991 European Pat. Off. .

OTHER PUBLICATIONS

W. Kaminsky, "Polymerization and Copolymerization of Olefins with Metallocene/Aluminoxane Catalysts," Shokubai vol. 33, No. 8, 1991, pp. 536-544, distributed Dec. 10, 1991.

Kaminsky, et al., *Angew. Chem., Int. Ed. Engl.*, 1985, 24, 507.

Ewen, et al., *J. Am. Chem. Soc.*, 1987, 109, 6544.
Ewen, et al. *J. Am. Chem. Soc.*, 1984, 106 6355.
Pino, et al., *J. Am. Chem. Soc.*, 1987, 109, 6189.
Kaminsky, et al., *Angew. Chem. Int. Ed. Engl.*, 1989, 28, 1216.
Yang, et al., *J. Am. Chem. Soc.*, 1991, 113, 3623.
Erker, et al., *J. Am. Chem. Soc.*, 1991, 113, 7594.
Ewen, et al. "Syndiospecific Propylene Polymerizations with Group 4 Metallocenes," *J Am. Chem. Soc*, 1988, 110, 6255-6256.
Kaminsky, et al., "Polymerization of Propene and Butene with a Chiral Zirconocene and Methylalumoxane as Cocatalyst," *Angew. Chem. Int. Ed. Engl.*, 1985, 24, No. 6, 507-508.

(List continued on next page.)

Primary Examiner—Patrick P. Garvin
Attorney, Agent, or Firm—Welsh & Katz, Ltd.

[57] ABSTRACT

The synthesis, and use as precatalysts of chiral organozirconium complexes for olefin polymerization are disclosed, having the structure $(C_5R'_{4-x}R^*_x) A (C_5R''_{4-y}R'''_y) M Q_p$, where x and y represent the number of unsubstituted locations on the cyclopentadienyl ring; R', R'', R''', and R* represent substituted and unsubstituted alkyl groups having 1-30 carbon atoms and R* is a chiral ligand; A is a fragment containing a Group 13, 14, 15, or 16 element of the Periodic Table; M is a Group 3, 4, or 5 metal of the Periodic Table; and Q is a hydrocarbyl radical, or halogen radical, with $3 \leq p \leq 0$. Related complexes may be prepared by alkylation of the corresponding dichorides. In the presence of methylalumoxane or triarylborane cocatalysts, these complexes form "cation-like" species which are highly active for olefin polymerization. In combination with a Lewis acid cocatalyst, propylene or other $\alpha$-olefin polymerization can be effected with very high efficiency and isospecificity.

26 Claims, 1 Drawing Sheet

OTHER PUBLICATIONS

Ewen, "Mechanisms of Stereochemical Control in Propylene Polymerizations with Soluble Group 4B Metallocene/Methylalumoxane Catalysts," *J. Am. Chem. Soc.*, 1984, 106, 6355–6364.

Sinn, et al., "Ziegler–Natta Catalysis, " *Advances in Organometallic Chemistry*, vol. 18, pp. 99–150.

Okuda, "Synthesis of Optically Active Macromolecules Using Metallocene Catalysts," *Angew. Chem. Int. Ed. Engl.*, 1992, 31, No. 1, 47–48.

Chien, et al., "Isospecific Polymerization of Propylene Catalyzed by rac-Ethylenebis(indenyl)methyzirconium 'Cation', " *J. Am. Chem. Soc.*, 1991, 113, 8570–8571.

Chien, et al., "Two-State Propagation Mechanism for Propylene Polymerization Catalyzed by rac-[anti-Ethylidene(1-$\eta^5$-tetramethylcyclo-pentadienyl)(1-$\eta^5$-indenyl)]dimethyltitanium," 8569–8570.

Roll, et al., *Chem. Int. Ed. Engl.*, 1990, 29, No. 3, 279–280.

Resconi, et al., "Diastereoselectivity in the Homogeneous Cyclopolymerization of 1,5-Hexadiene," *American Chemical Society*, 1990, 4953–4944.

Pino, et al., "Stereospecific Polymerization of Propylene: An Outlook 25 Years after its Discovery," *Angew. Chem. Int. Ed. Engl*, 1980, 19, 857–875.

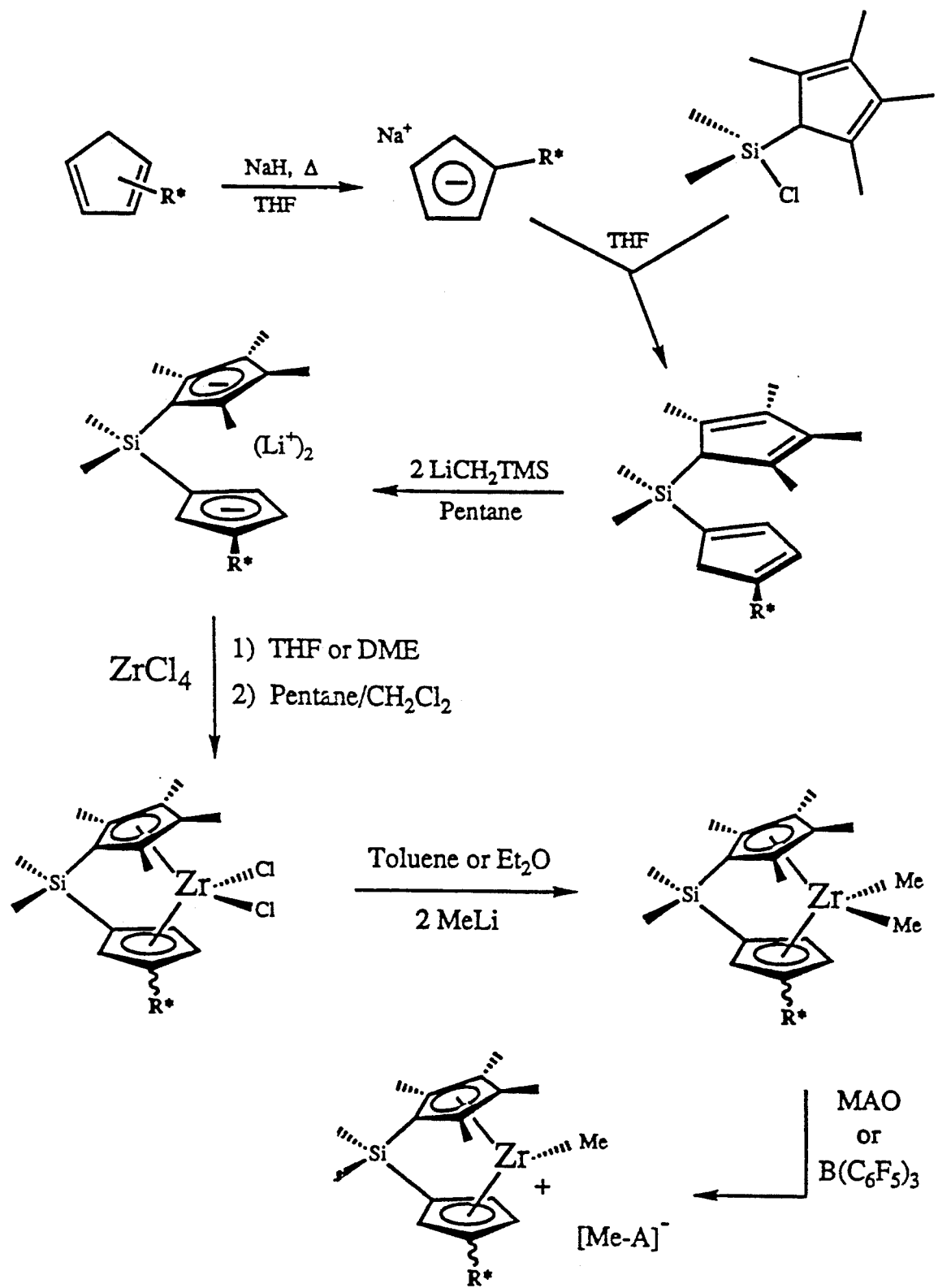

HOMOGENEOUS CATALYSTS FOR STEREOREGULAR OLEFIN POLYMERIZATION

This invention was made with Government support under Grant Number DE-FG02-86ER13511 awarded by the Department of Energy. The Government has certain rights in the invention.

This invention relates to an improved catalyst and method for using the catalyst, and more specifically, an improved chiral catalyst for use in the stereoregular polymerization of olefins.

BACKGROUND OF THE INVENTION

The polymerization and copolymerization of α-olefins, and acetylenic monomers with so-called Ziegler-Natta catalysts, which are generally defined as a mixture of a group I-III metal alkyl and a transition metal complex from group III-VIII, are well established in the chemical industry. However, catalyst improvements would be of great practical importance if better control over molecular weight and molecular weight distribution could be obtained, the use of undesired excess of co-catalysts were eliminated, and stereoregular polymers could be easily prepared.

As such, there is a need to control stereochemistry in a great many chemicals and polymers and chiral metal catalysts offer an efficient means to do this. The design of a chiral metal catalyst necessarily relies on the design of appropriate ligands which create an asymmetric environment about the metal center. Certain classes of organolanthanide catalysts which are highly active for a variety of reactive purposes are known and described in U.S. Pat. Nos. 4,668,773 and 4,801,666. Organolanthanide hydrides, $(Cp'_2LnH)_2$ and $(Me_2SiCp''_2LnH)_2$, $(Cp'=N_5(CH_3)_5C_5, Cp''=N_5(CH_3)_4C_5$ are known to effectively and selectively catalyze a number of olefin transformations including hydrogenation, oligomerization/polymerization, and hydroamination. Heretofore it has not been known whether an appropriate coordination environment could be devised to effect metal-centered asymmetric catalytic transformation and to obtain favorable characteristics, such as extremely rapid kinetics, large turnover capacity, and reactivity tunable with the specific chiral ligand used. The synthesis of stereoregular polymers has been reported with the use of chiral organo-group IV (Ti, Zr, Hf) catalysts having approximate $C_2$ symmetry. Such catalysts resulted in isospecific polymerization of α-olefins. Most of the ligands for these "$C_2$" catalysts are based upon indenyl or related cyclopentadienyl components, and are difficult and expensive to synthesize. In only a few cases are the isotacticities of the polymeric products at a useful level.

SUMMARY OF THE INVENTION

Accordingly, an object of the subject invention is an improved catalyst for the efficient polymerization of α-olefins to produce stereoregular polymers.

A further object of the subject invention is a catalyst for polymerization which, when used with a cocatalyst, permits better control over molecular weight and molecular weight distribution of the resulting polymer.

A still further object of the subject invention is a catalyst for polymerization which, when used with an appropriate cocatalyst, permits better control over the desired physical properties of the resulting polymer.

These and other objects of the subject invention are attained in the subject invention whereby a rigid chiral ligand template is arrayed in a symmetrical manner about the metal coordination sphere (B) as opposed to the "$C_2$" symmetrical array of (A) as normally observed.

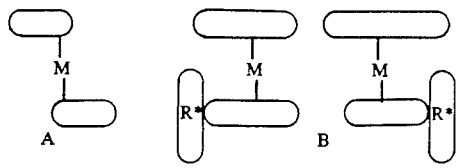

The R* group is a natural chiral ligand such as menthyl or neomenthyl which renders the two enantiomers of B diasteromeric and thus offers a means for separation. These ligands are known to be efficacious for enantioselective olefin hydrogenations and hydroaminations mediated by organolanthanides.

DESCRIPTION OF THE DRAWING

The FIGURE is a schematic showing the synthesis of the catalysts of the subject invention.

In the practice of the subject invention as set forth in the FIGURE, a cyclopentadienyl compound (CpR*) having a chiral substituent such as menthyl or neomenthyl (R*) is refluxed with sodium hydride in a polar, high-boiling solvent such as THF, resulting in the sodium salt of the cyclopentadienyl compound, which is combined with $(CH_3)_2AClCp''$ ($Cp''=C_5R_4$ where R=an alkyl group ($C_1$-$C_{12}$), and preferably methyl) in a polar solvent such as DMSO, dimethyl ether, dimethyl formamide, or preferably THF to yield $(CH_3)_2SiClCp''(CpR*)$. A is a bridging element or fragment containing an element as set forth below. This bridged chiral cyclopentadienyl is reacted with a deprotonating agent such as $LiCH_2TMS$ in an organic non-polar, aprotic solvent under ambient temperature conditions. Then with $MX_4$ (M=Ti, Zr, Hf and X=Cl, Br, or I. $MX_4$ is preferably $ZrCl_4$) in a polar solvent such as THF or dimethyl ether to yield $(CH_3)_2Si(C_5R_4)C_5R*H_3MX_2$. The halogen may be replaced with alkyl groups ($C_1$-$C_{12}$, and preferably methyl), by addition of an alkylating agent such as RLi, or RMgX in a nonpolar solvent. With the addition of a Lewis acid cocatalyst such as alumoxane or $B(C_6F_5)_3$, α-olefins such as propylene may be easily polymerized. A Brönsted acid may also be used as a cocatalyst. Suitable Brönsted acids which may be used have the formula $HY+2-$ where $Y+$ is a fragment containing a Group 15 or 16 element in the form $N(R^1R^2R^3)+$ where $R^1$, $R^2$, and $R^3$ are alkyl groups ($C_1$-$C_{12}$) and $Z-$ is a fragment containing a Group 13 element. Such acids may be $HN(CH_3)_3{}^+$ $B(C_6F_5)_4{}^-$; $HN((CH_3)_3{}^+$ $Al(C_6F_5)_4{}^-$ or $HP(CH_3)_3{}^+$ $B(C_6F_5)_4{}^-$.

The catalyst thus prepared may be defined as $(C_5R'_{4-x}H_xR*)$ A $(C_5R''_{4-y}H_yR''')$ M $Q_p$ M $Q_p$, where x and y represent the number of unsubstituted locations on the cyclopentadienyl ring; R', R", R''' and R* represent alkyl groups having 1-30 carbon atoms and R* is a chiral ligand; A is a Group 13, 14, 15, 16 element of the Periodic Table or element fragment and preferably Si; M is a Group 3A, 4A, or 5A metal of the Periodic Table and preferably Zr; and Q is a hydrocarbyl, aryl, halogen radical, with $3 \leq p \leq o$. In the alternative, Q could be a mixture of hydrocarbyl, aryl, or halogen radicals; in such a case Q would become Q' Q" and possibly Q'", with p=1.

By changing the chiral ligand (R*), the physical properties of the resulting polymers can be adjusted as desired. By changing A, the solubility and other properties of the catalyst can be affected.

R' R" and R'" may be hydrogen or a hydrocarbyl radical. Examples of hydrocarbyl radicals useful include alkyl, alkenyl, aryl, alkylaryl, arylalkyl radicals. More specifically, exemplary hydrocarbyl radicals include methyl, ethyl, n-propyl, isopropyl, butyl, tert-butyl, amyl, isoamyl, hexyl, isobutyl, heptyl, octyl, nonyl, decyl, cetyl, phenyl, methylene, ethylene, propylene, and other like groups.

A is a stable component such as an element or an element containing fragment that bridges the two $(C_5(R)_4)$ rings in order to render the catalyst stereorigid. The element in A may be from Groups 13, 14, 15, 16 of the Periodic Chart. Examples of A include fragments containing Si, Ge, S, C, Sn, Pb, B, Al, Ga, In, Tl, N, P, As, Sb, Bi, Se, and Te. The preferred A is $Si(CH_3)_2$, although the element may have alkyl or aryl groups where C=1-30.

Similarly, Q may be any of the hydrocarbyl groups listed for R above, but preferably, Q is a halogen, and most preferably, Q is chlorine. Also, in the preferred embodiment, p is 2.

The metallocene catalyst must be chiral and have non $C_2$ based symmetry, i.e., non-superimposable on its mirror image, for the polymerization of propylene and higher α-olefins in order to produce a useful polymer product. It was discovered that chirality in a metallocene catalyst exhibits stereochemical control over the polymer product and produces a polymer with a high isotactic index. In addition, the catalyst should be stereo-rigid to aid in the stereo-chemical control of the polymerization.

The catalyst systems of the present invention also may include a Lewis acid cocatalyst in combination with the metallocene catalysts. Preferably, the cocatalyst is an alumoxane represented by the general formula $(R-Al-O)_n$ for the cyclic form and $R(R-A-l-O-)_n-AlR_2$ for the linear form. R is an alkyl group with preferably 1-5 carbons and n is an integer preferably from 1 to about 20. Most preferably, R is a methyl group. An alternative is a triaryl borane compound such as $B(C_6F_5)_3$.

DETAILED DESCRIPTION OF THE INVENTION

Materials and Methods

All operations were performed with rigorous exclusion of oxygen and moisture in flamed Schlenk-type glassware in a dual manifold Schlenk line or interfaced to a high vacuum ($10^{-5}$ torr) system, or in a nitrogen filled glovebox with a high capacity atmosphere recirculator. Argon, ethylene, propylene, dihydrogen, and deuterium gas were purified by passage through a supported MnO oxygen removal column and a molecular sieve column. Aliphatic hydrocarbon solvents were pretreated with conc. $H_2SO_4$, $KMnO_4$ solution, $MgSO_4$, and Na+4A molecular sieves. All reaction solvents were distilled from Na/K/benzophenone under nitrogen and were condensed and stored in vacuo in bulbs on the vacuum line containing a small amount of $[Ti\eta-C_5H_5)_2Cl]_2ZnCl_2$ as indicator. Toluene, cyclohexane, and heptane were additionally vacuum transferred onto Na/K and stirred for at least a day before use in catalytic experiments. The olefins were purified by stirring over Na/K for at least six hours and were freshly vacuum transferred. Deuterated solvents were dried over Na/K alloy and vacuum transferred before use.

Tetramethylcyclopentadiene was prepared by the procedure set forth in *Organometallics*, 1984, 3, 819–821. The complexes (trimethylsilyl)methyllithium ($LiCH_2TMS$) and 2-lithium-mesitylene were also prepared as known in the art.

EXAMPLE 1

Preparation of $Cp_2$ Intermediates

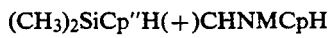
$(CH_3)_2SiCp"H(+)CHNMCpH$

A suspension of 7.76 g (36.15 retool) $Me_2SiClCp"$ and 9.0 g (39.76 mmol) $Na^+(C_5H_5NM)^-$ (NM=neomenthyl) in 120 ml THF is stirred for 12 hours at ambient temperature. The solvent is then removed. The solution is then liberally extracted with 200 ml pentane, the mixture filtered, and the solvent removed in vacuo to give a quantitative yield of $(CH_3)_2SiCp"HCHNMCpH$ as a clear colorless oil.

EXAMPLE 2

$(CH_3)_2SiCp"H(-)(MCp)H$

A suspension of 7.76 g (36.15 mmol) $Me_2SiClCp"$ and 9.0 g (39.16 mmol) $Na^+(C_5H_5M)^-$ (M=menthyl) in 120 ml THF is stirred for 12 hours at ambient temperature. The solution is then extracted with 200 ml pentane and the mixture is filtered. The solvent is removed in vacuo to give a quantitative yield (18.22 g) of $(CH_3)_2SiCp"H(-)MCpH$ as a clear colorless oil.

EXAMPLE 3

Preparation of Chiral Li Intermediate

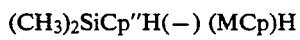
$(CH_3)_2SnCp"(+)NMCpLi_2$

A suspension of $(CH_3)_2SnClCp"$ and $Na^+(C_5H_5NM)^-$ (1:1 mol ratio) in 120 ml THF is stirred for 12 hours at ambient temperature. Two equivalents of $LiCH_2TMS$ is added and stirred in a pentane solution. The pentane is removed, the residue extracted, filtered, and the solvent is removed to yield $(CH_3)_2SnCp"(+)NMCpLi_2$.

EXAMPLE 4

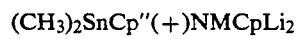
$(CH_3)_2GeCp"(+)NMCpLi_2$

A suspension of $(CH_3)_2GeClCp$ and $Na^+(C_5H_5NM)^-$ (1:1 mol ratio) in 120 ml THF is stirred for 12 hours at ambient temperature. $LiCH_2TMS$ is added and stirred in a pentane solution. The pentane is removed, the residue extracted with THF, filtered, and the solvent is removed as in Example 3 to yield $(CH_3)_2GeCp"(+)NMCpLi_2$.

EXAMPLE 5

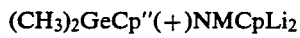
$(CH_3)_2SiCp"(C_2H_5)CpLi_2$

A suspension of $(CH_3)_2SiClCp$ and $Na^+(C_5H_4C_2H_5)^-$ in 12 ml THF is stirred for 12 hours at ambient temperatures. $LiCH_2TMS$ is added and stirred. The solvent is removed, the residue extracted, filtered, and the solvent removed as in Example 3 to yield 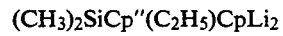$(CH_3)_2SiCp"(C_2H_5)CpLi_2$.

EXAMPLE 6

Synthesis of $(CH_3)_2SiCp''(+)NMCpLi_2$

To the reaction product of Example 1 is added 6.6 g $LiCH_2TMS$ in 250 ml pentane at ambient temperature and the mixture is stirred for 24 hours. The solvent is removed in vacuo to yield 16.75 g of a microcrystalline solid.

EXAMPLE 7

Synthesis of $(CH_3)_2SiCp''(-)NMCpLi_2$

To the reaction product of Example 2 is added 6.6 g $LiCH_2TMS$ in 250 ml pentane at ambient temperature and the mixture is stirred for 24 hours. The solvent is removed in vacuo to yield 16.75 g of a microcrystalline solid.

EXAMPLE 8

Preparation of Chiral Zirconium Catalyst

Synthesis of $(CH_3)_2Si(CH_3)_4C_5)[(+)NM\ C_5H_3]ZrCl_2$ $(CH_3)_2SiCp''(+)NMCpLi_2$ and $ZrCl_4$ are combined in a 1:1 molar ratio in THF and stirred at 60° C. for 18 hours. Solvent is removed in vacuo and the chiral zirconium dichloride is extracted and diluted with pentane. Concentration and slow cooling of the resulting solution affords the zirconocene complex as a microcrystalline solid.

EXAMPLE 9

Synthesis of $(CH_3)_2Si(Cp'')[(+)NMCp]Zr(CH_3)_2$

Reaction of the above dichloride complex with methyl lithium in toluene affords the corresponding dimethyl complex.

The dimethyl or the dihydrogen complex can be converted to the corresponding cationic olefin polymerization catalyst by reaction with 1.0 equivalent of $B(C_6F_5)_3$ or 500–1000 equivalents of methylalumoxane.

EXAMPLE 10

Olefin Polymerization

Under rigorously anaerobic conditions, a flask containing 8 mg of $(CH_3)_2Si(Cp'')[(+)NMCp]Zr(CH_3)_2$ and 10 mg of $B(C_6F_5)_3$ is dissolved in 50 ml of pentane; the vessel is evacuated and filled with propylene gas. The reaction is carried out at ambient temperature and pressure. The polymerization commences immediately and is monitored manometrically. At completion, the polymerization is quenched by the addition of acidified aqueous methanol to afford polypropylene. The methanol-insoluble fraction (>90% of the product) is highly crystalline and is generally 97% isotactic by $^{13}C$ NMR spectroscopy.[1,4]

EXAMPLE 11

Olefin Copolymerization

Under rigorously anaerobic conditions, a flask containing 8 mg of $(CH_3)_2Si(Cp'')[(+)NMCp]Zr(CH_3)_2$ and a molar equivalent of $B(C_6G_5)_3$ is dissolved in 50 ml of pentane; the vessel is evacuated and filled with a 50/50 mixture propylene and butene gas. The reaction is carried out at a temperature in the range of −20° C. to −40° C. at ambient pressure. The polymerization commences immediately and is monitored manometrically. At completion, the polymerization is quenched by the addition of acidified aqueous methanol to afford a random propylene-butylene copolymer. The methanol-insoluble fraction (>90% of the product) is highly crystalline and is generally highly isotactic by $^{13}C$ NMR spectroscopy. Block copolymerization can be carried out by first reacting under 100% propylene atmosphere, and then reacting under a 100% butene atmosphere and finally quenching.

EXAMPLE 12

Olefin Dimerization

Under rigorously anaerobic conditions, a flask containing 8 mg of $(CH_3)_2Si(Cp'')[(+)NMCp]Zr(CH_3)_2$ is charged with 50 ml of pentane; the vessel is evacuated and filled with iso-butylene. The polymerization reaction is carried out at ambient temperature and pressure. The dimerization commences immediately and is monitored manometrically. At completion, the dimerization is quenched by the addition of acidified aqueous methanol to yield the dimer.

EXAMPLE 13

Olefin Hydrogenation

Under rigorously anaerobic conditions, a flask containing 8 mg of $(CH_3)_2Si(Cp'')[(+)NMCp]Zr(CH_3)_2$ and 500 equivalents of methyl alumoxane is charged with 50 ml of pentane; the vessel is evacuated and filled with propylene gas and hydrogen gas in a 1:1 ratio. Hydrogenation commences immediately and may be monitored manometrically to completion.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. A catalyst for use in the polymerization and copolymerization of α-olefins, said catalyst represented by the formula:

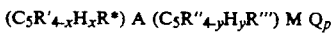

where x and y represent the number of unsubstituted locations on the cyclopentadienyl ring; R', R'', R''', and R* represent alkyl groups having 1–30 carbon atoms, R* having a chiral substituent selected from the group consisting of menthyl, neomenthyl, and phenylmenthyl; A comprises a Group 13, 14, 15, or 16 element of the Periodic Table and acts as a structural bridge between the cyclopentadienyl rings; M is a Group 3, 4, or 5 metal of the Periodic Table; and Q is a hydrocarbyl radical, or halogen radical, with $3 \leq p \leq o$.

2. The catalyst of claim 1 wherein A is selected from a fragment containing an element selected from the group consisting of C, Ge, Sn, P, N, B, or Si.

3. The catalyst of claim 1 wherein A is a fragment containing silicon.

4. The catalyst of claim 1 wherein M is selected from the group consisting of Zr, Hf, Ti, Sc, V, Nd, Ta, Y, and La.

5. The catalyst of claim 1 wherein M is zirconium.

6. The catalyst of claim 1 wherein Q is a halogen or an alkyl group having 1-12 carbon atoms.

7. The catalyst of claim 1 wherein Q is selected from the group consisting of halogen radicals, aryl radicals, alkyl radicals, and mixtures thereof.

8. A method of preparing a catalyst for use in polymerizing olefins, comprising the steps of:
  1) combining in a polar solvent a cyclopentadienyl anion having a chiral substituent selected from the group consisting of menthyl, neomenthyl, or phenylmenthyl with a cyclopentadienyl compound having the substituent $AR_2X$ where A comprises a Group 13, 14, 15, or 16 element of the Periodic Table, R is an alkyl group ($C_1$-$C_{12}$) and X is a halogen;
  2) mixing the product of Step 1 with a deprotonating agent in a nonpolar solvent;
  3) mixing the product of Step 2 with $MX_4$ in a polar solvent, where M=an element from Groups 3, 4, or 5 of the Periodic Table, and X is a halogen; and
  4) separating a chiral catalytic complex from the reaction product of Step 3 by mixing with a nonpolar solvent and extracting from said nonpolar solvent.

9. The claim of claim 8 wherein said catalyst is added to a Lewis acid as a cocatalyst to form an efficient catalyst in polymerization reactions.

10. The method of claim 7 wherein said Lewis acid is selected from the group of alumoxanes and $B(C_6F_5)_3$.

11. The method of claim 8 wherein said catalyst is added to a Brönsted acid as a cocatalyst to form an efficient catalyst in polymerization reactions.

12. The method of claim 8 wherein said catalyst is added to a Brönsted acid of the formula $HY^+Z^-$ where $Y^+$ is a fragment containing Groups 15 and 16 elements in the form $N(R^1R^2R^3)^+$ where $R^1$, $R^2$, and $R^3$ are alkyl groups ($C_1$-$C_{12}$) and $Z^-$ is a fragment containing Group 13 elements.

13. The method of claim 11 wherein said Brönsted acid is selected from the group consisting of $HN(CH_3)_3{}^+B(C_6F_5)_4{}^-$, $HN((CH_3)_3{}^+Al(C_6F_5)_4{}^-$ and $HP(CH_3)_3{}^+B(C_6F_5)_4{}^-$.

14. A catalyst system for use in the polymerization and copolymerization of α-olefins, said system having a catalyst represented by the formula:

$$(CpR^*)A(Cp'')MQ_p$$

where Cp and Cp'' each represent cyclopentadienyl rings; $R^*$ represents an alkyl group (C=1-30) having a chiral substituent selected from the group consisting of menthyl, neomenthyl, and phenylmenthyl; A comprises a Group 13, 14, 15, or 16 element of the Periodic Table and acts as a structural bridge between the cyclopentadienyl rings; M is a Group 3, 4, or 5 metal of the Periodic Table; and Q is a hydrocarbyl radical, or halogen radical with $3 \leq p \leq o$.

15. The catalyst of claim 14 wherein A is selected from the group consisting of C, Ge, Sn, P, N, B, and Si containing fragment.

16. The catalyst of claim 14 wherein A is $Si(CH_3)_2$.

17. The catalyst of claim 14 wherein M is selected from the group consisting of Zr, Hf, Ti, Sc, V, Nd, Ta, Y, and La.

18. The catalyst of claim 14 wherein M is zirconium.

19. The catalyst of claim 14 wherein Q is a halogen or an alkyl group having 1-12 carbon atoms.

20. The catalyst system of claim 14 further has a Lewis acid or a Brönsted acid activating catalyst.

21. The method of claim 8 wherein said cyclopentadienyl anion with a chiral substituent is prepared by refluxing a cyclopentadienyl compound having a chiral substituent with NaH in a polar solvent.

22. The method of claim 8 wherein said anion of Step 1 is combined with said compound at ambient temperatures in tetrahydrofuran.

23. The method of claim 8 wherein said deprotonating agent is $LiCH_2Si(CH_3)_2$.

24. The method of claim 8 wherein said product of Step 2 is mixed with said deprotonating agent at ambient temperatures.

25. The method of claim 8 wherein said chiral catalytic complex is alkylated.

26. The method of claim 8 wherein said chiral catalytic complex is methylated.

* * * * *